(12) United States Patent
Wang et al.

(10) Patent No.: US 12,508,997 B2
(45) Date of Patent: Dec. 30, 2025

(54) FOLDABLE BICYCLE RACK FOR CARS

(71) Applicant: KING RACK INDUSTRIAL CO., LTD., Taichung (TW)

(72) Inventors: Chiu Kuei Wang, Taichung (TW); Hugues Espesset, Saint Juery (FR)

(73) Assignee: KING RACK INDUSTRIAL CO., LTD., Taichung (TW)

( * ) Notice: Subject to any disclaimer, the term of this patent is extended or adjusted under 35 U.S.C. 154(b) by 369 days.

(21) Appl. No.: 18/084,564

(22) Filed: Dec. 20, 2022

(65) Prior Publication Data
US 2023/0202403 A1 Jun. 29, 2023

(30) Foreign Application Priority Data

Dec. 28, 2021 (TW) ................................. 110215511

(51) Int. Cl.
*B60R 9/10* (2006.01)
(52) U.S. Cl.
CPC ...................................... *B60R 9/10* (2013.01)
(58) Field of Classification Search
CPC ...................................................... B60R 9/10
USPC ......................................................... 224/549
See application file for complete search history.

(56) References Cited

U.S. PATENT DOCUMENTS

| | | | |
|---|---|---|---|
| 5,794,828 A * | 8/1998 | Colan ....................... | B60R 9/10 224/924 |
| 9,096,182 B1 * | 8/2015 | Roth ........................ | B60R 11/00 |
| 9,555,744 B1 * | 1/2017 | Roth ........................ | B60R 9/10 |
| 10,046,712 B1 * | 8/2018 | Foley ....................... | B60R 9/06 |
| 2009/0120984 A1 * | 5/2009 | Sautter ..................... | B60R 9/10 224/532 |
| 2014/0027484 A1 * | 1/2014 | Loken ...................... | B60R 9/06 224/521 |
| 2014/0125045 A1 * | 5/2014 | Nusbaum ................. | B60R 9/10 280/769 |
| 2014/0291373 A1 * | 10/2014 | Wang ....................... | B60R 9/06 224/549 |
| 2018/0072237 A1 * | 3/2018 | Kuschmeader .......... | B60R 9/10 |
| 2019/0270423 A1 * | 9/2019 | Hutton ..................... | B60R 9/06 |

FOREIGN PATENT DOCUMENTS

| DE | 10 2009 016 529 | * 10/2010 |
|---|---|---|
| EP | 2987662 | * 2/2016 |

* cited by examiner

*Primary Examiner* — Peter N Helvey
(74) *Attorney, Agent, or Firm* — Che-Yang Chen; Law Office of Michael Chen (57) ABSTRACT

A foldable bicycle rack includes a base attached to a vehicle, and a Platform onto which two supports are connected. The Platform includes two posts connected thereto and each post includes a restriction part formed thereto. The supports each include two trays to respectively support a front wheel and a rear wheel of a bicycle. An upright frame includes two tubes which are pivotably connected to the two restriction parts of the two posts, so that the upright frame is pivotably folded toward the supports. Two quick-releases are respectively connected to the two tubes so as to securely position each tube between the quick-release and the restriction part corresponding thereto.

2 Claims, 9 Drawing Sheets

FOLDABLE BICYCLE RACK FOR CARS

BACKGROUND OF THE INVENTION

1. Fields of the Invention

The present invention relates to a bicycle rack attached to a vehicle, and more particularly, to a foldable bicycle rack using quick-releases.

2. Descriptions of Related Art

There are currently two types of bicycle racks attached to a vehicle, one of which is called roof-mounted bicycle rack, and the other is attached to a hitch ball of the rear end of a car. The latter is not affected by height limit of tunnels so that the bicycle rack attached the rear end of a car is more popular than the first one.

The bicycle rack at the rear end of a car occupies a significant space and will be a problem when the car is parked into a garage. Although there are a variety of foldable bicycle racks on the market, the folding mechanism usually utilizes bolts to selectively connect between the positioning holes, or selectively connects between the plurality of positioning holes through elastic pull pins. That is to say, the uses have to be remove the bolts from the positioning holes, and then insert the bolts to desired positioning holes so as to achieve the folding features.

The present invention intends to provide a foldable bicycle rack that uses at least one quick-release to eliminate the shortcomings mentioned above.

SUMMARY OF THE INVENTION

The present invention relates to a foldable bicycle rack and comprises a base including a connector and a platform. The platform includes two posts connected thereto, and each post includes a restriction part formed thereto. At least one support is connected to the platform and includes two trays for respectively supporting a front wheel and a rear wheel of a bicycle. An upright frame is an inverted U-shaped frame and includes two tubes. Each tube includes a hole defined therethrough. The two tubes of the upright frame are pivotably engaged with the restriction parts of the two posts. The upright frame is pivotably folded toward the at least one support. Two quick-releases are respectively connected to the two tubes, and each quick-release includes a lever, an engaging part, a shaft and a nut. The shaft is pivotably connected to the lever and extends through the engaging part and the hole of the tube corresponding to the shaft, and is connected to the nut.

When the lever is pivoted and the quick-release is in a locked status, the tube is locked between the engaging part and the restriction part such that the upright frame is positioned at an upright position or a transverse position.

Preferably, each of the restriction parts includes an upright groove and a transverse groove. The tubes of the upright frame each are partially located in either the upright groove or the transverse groove.

Preferably, each engaging part and each of the upright groove and the transverse groove of each restriction part include a curved inner face that is matched with the tubes of the upright frame.

Preferably, each of the two tubes of the upright frame includes a sleeve mounted thereto. The sleeve includes two protrusions. A resilient rope includes two ends mounted to the protrusions and is mounted to the lever of the quick-release corresponding thereto so as to restrict the lever from shaking.

The primary object of the present invention is to provide a foldable bicycle rack, and the upright frame of the bicycle rack is position at an upright position or a transverse position by using two quick-releases.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 4 and 9, the foldable bicycle rack of the present invention comprises a base 1, two supports 2 and an upright frame 3. The base 1 includes a connector 11 and a platform 12. The connector 11 connects the bicycle rack to a car (not shown). The platform 12 has a U-frame and a rectangular frame which is connected to the top of the U-frame, and two posts 13 are connected to the rectangular frame of the platform 12. Each post 13 includes a restriction part 14 formed thereto. Each of the restriction parts 14 includes an upright groove 141 and a transverse groove 142.

The two supports 2 are connected to the top face of the platform 12 and each include two trays 21, 22 so as to respectively support a front wheel and a rear wheel of a bicycle (not shown).

An upright frame 3 is an inverted U-shaped frame and includes two tubes 31. Each tube 31 includes a hole 311 defined therethrough. The two tubes 311 of the upright frame 3 are pivotably engaged with the two restriction parts 14 of the two posts 13, so that the upright frame 3 is pivotably folded toward the supports 2. The two tubes 31 of the upright frame 3 each are partially located in either the upright groove 141 or the transverse groove 142.

Two quick-releases 4 are respectively connected to the two tubes 31, and each quick-release 4 includes a lever 41, an engaging part 42, a shaft 43 and a nut 44. The shaft 43 is pivotably connected to a cam-shaped end of the lever 41.

The shaft 43 extends through the engaging part 42 and the hole 311 of the tube 31 corresponding to the shaft 43, and is connected to the nut 44.

Figure 1:
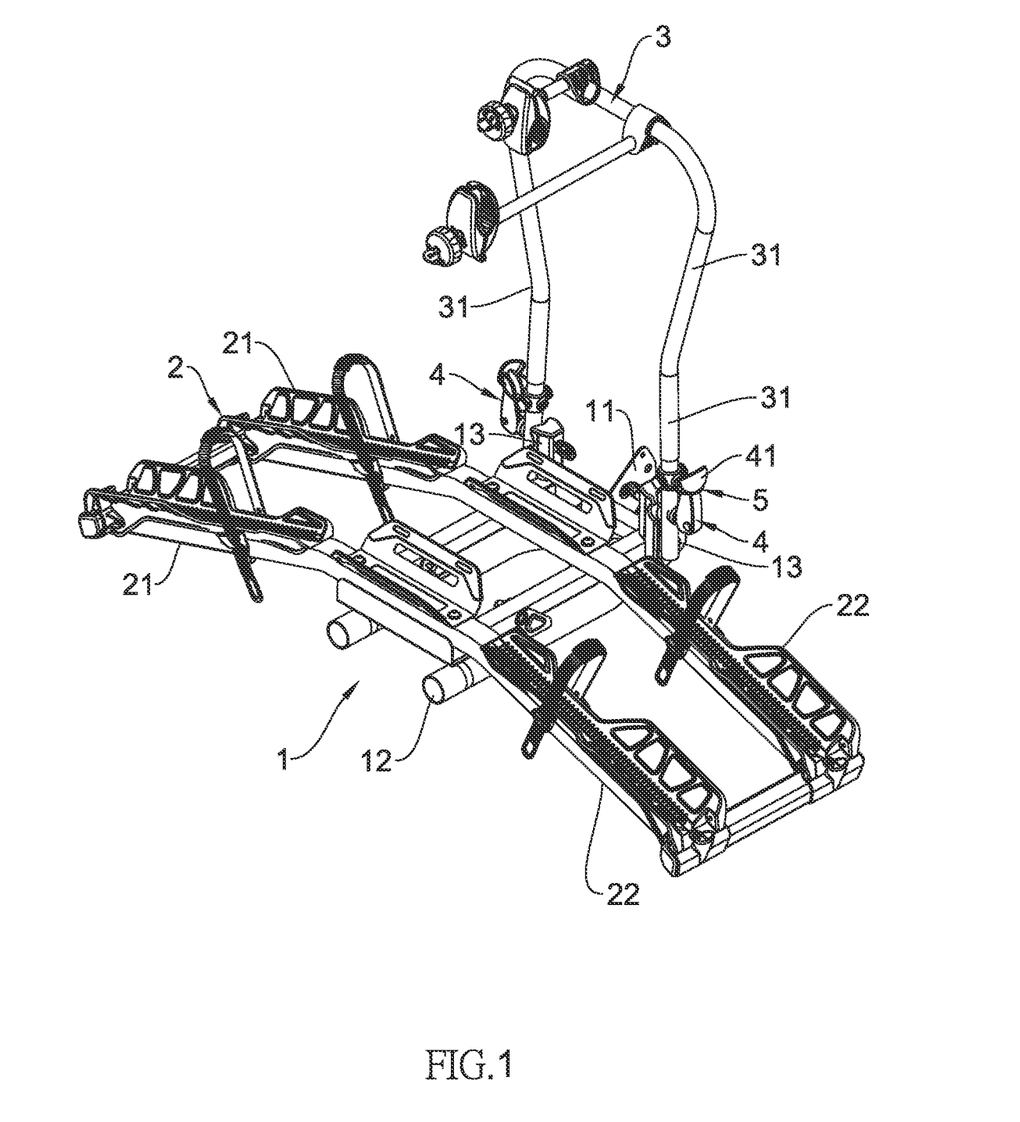
FIG. 1 is a perspective view to show the foldable bicycle rack of the present invention.
Figure 2:
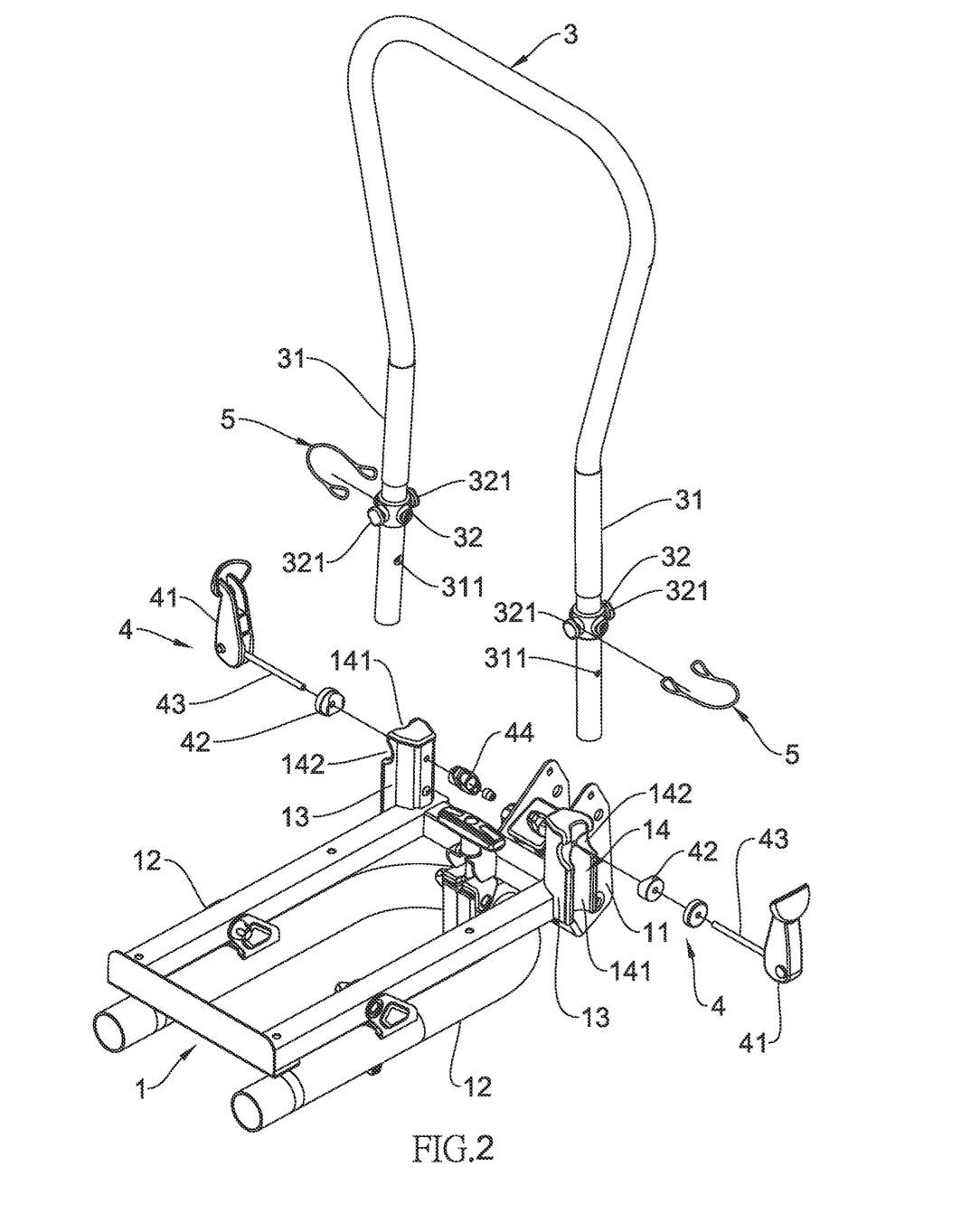
FIG. 2 shows the upright frame, the platform and the two quick-releases of the foldable bicycle rack of the present invention.
Figure 3:
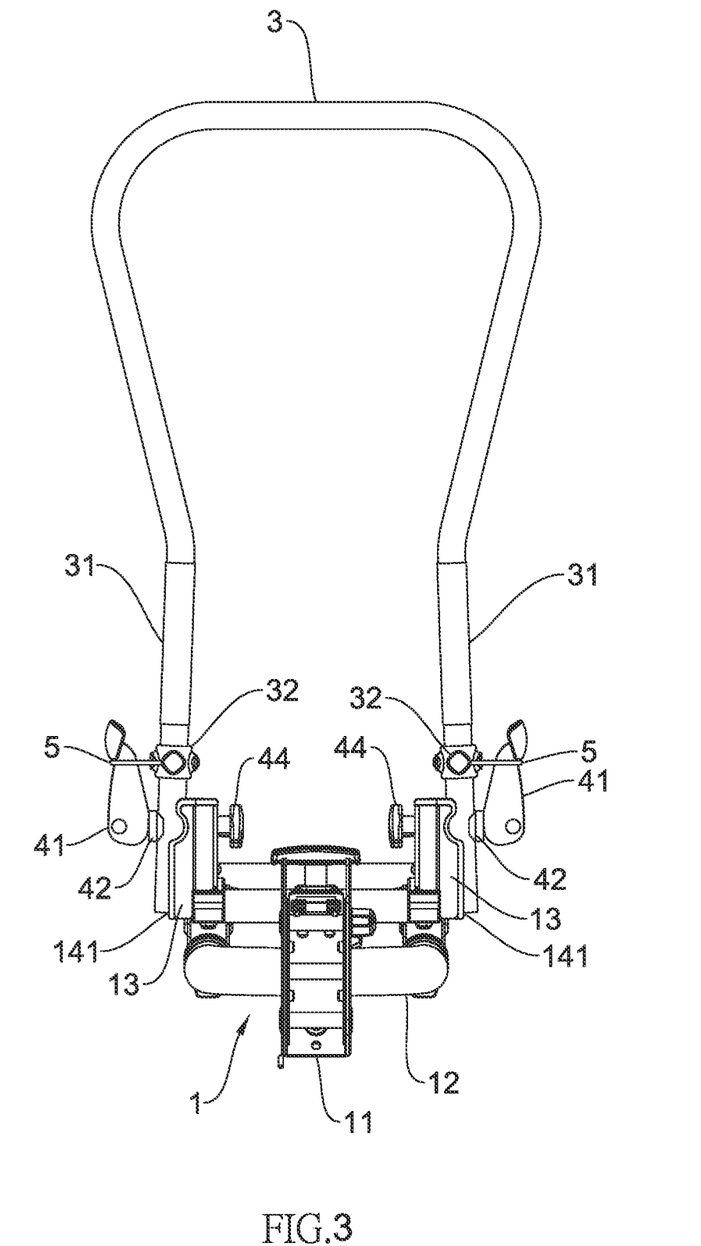
FIG. 3 is a rear view to show a combination of the upright frame, the platform and the two quick-releases of the foldable bicycle rack of the present invention.
Figure 4:
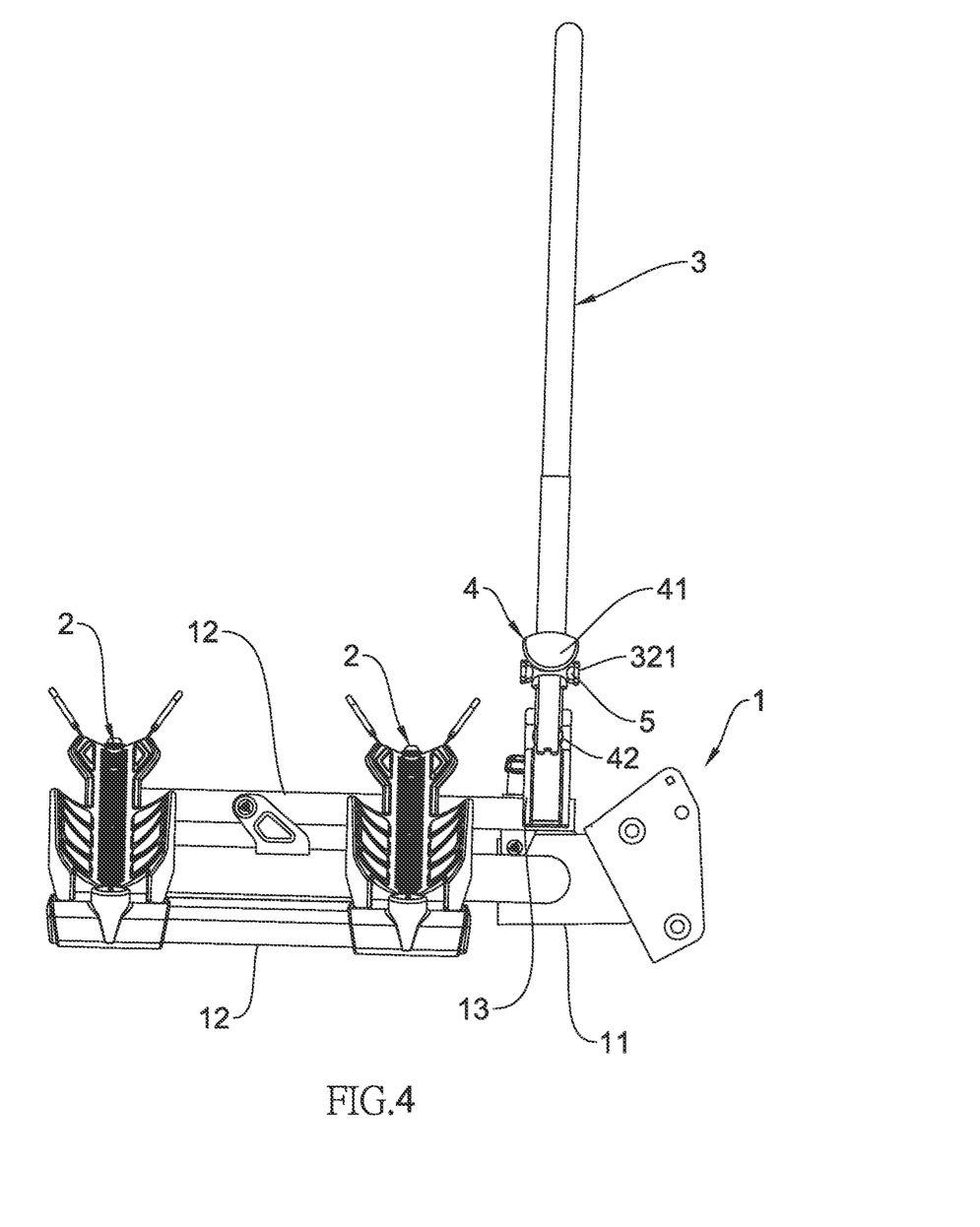
FIG. 4 is a side view of the foldable bicycle rack of the present invention.
Figure 5:
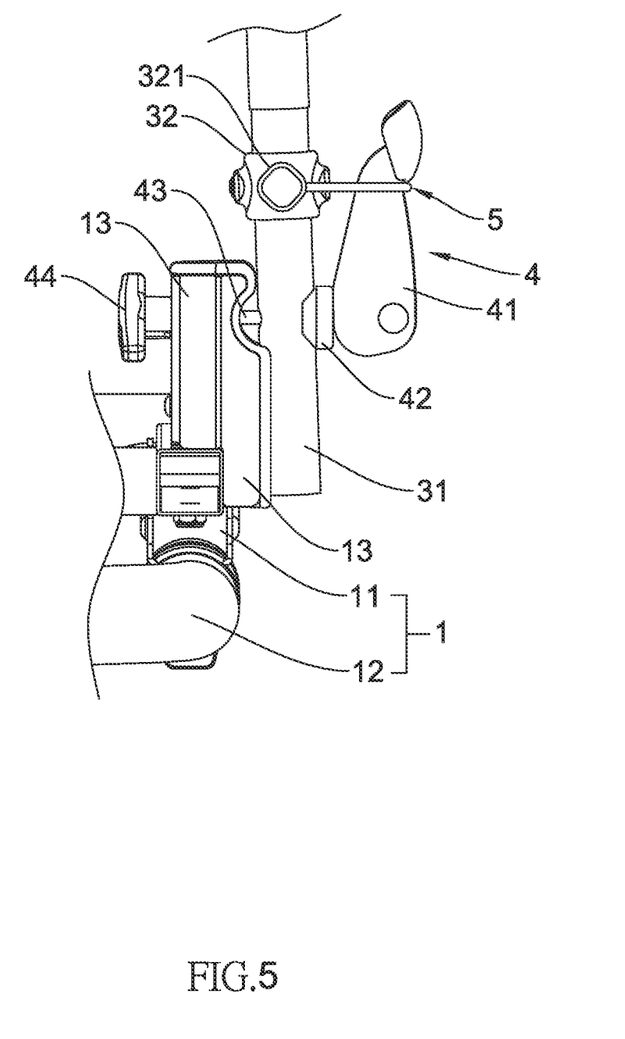
FIG. 5 shows that the tube of the upright frame is positioned at the upright position by the quick-release.
Figure 6:
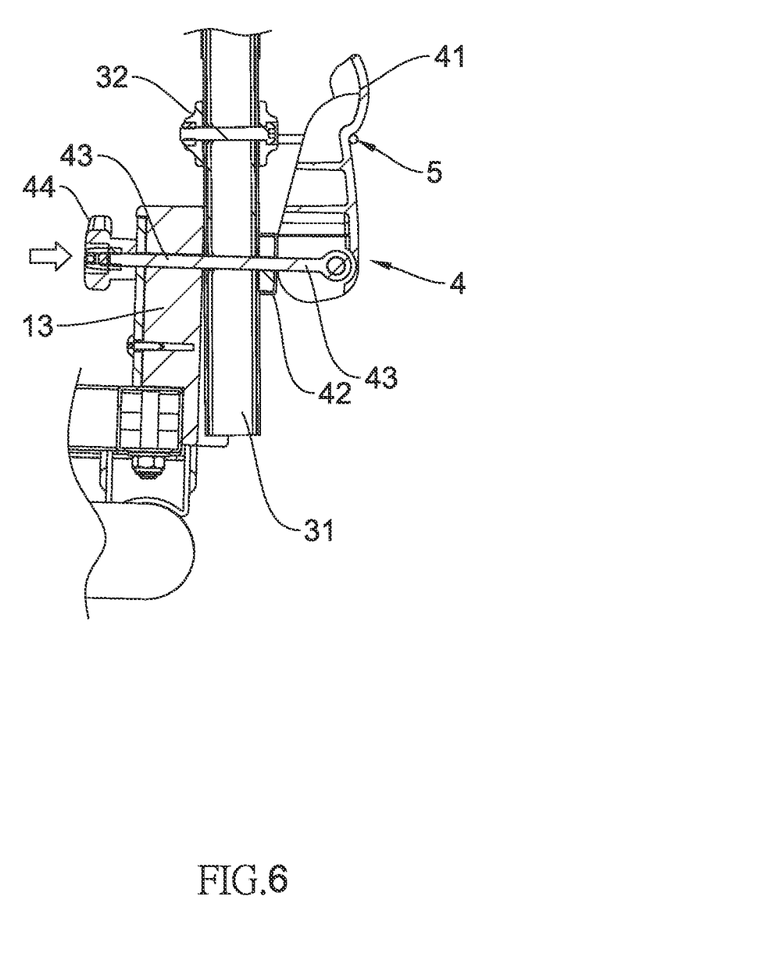
FIG. 6 is a cross sectional view of the disclosure in FIG. 5.
Figure 7:
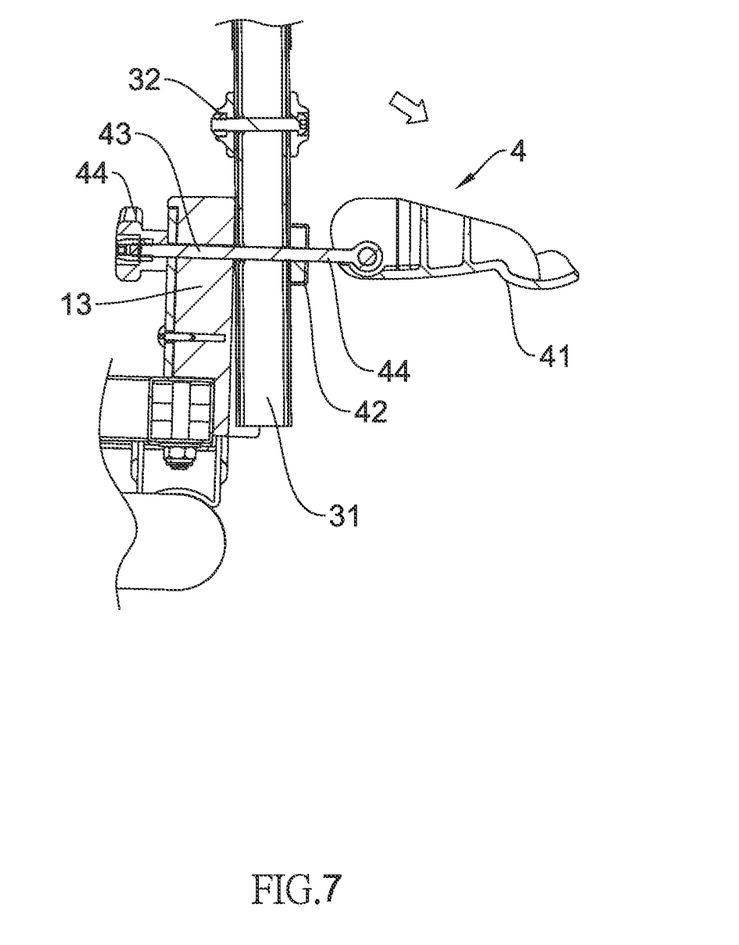
FIG. 7 is a cross sectional view to show that the lever the quick-release is pivoted downward.
Figure 8:
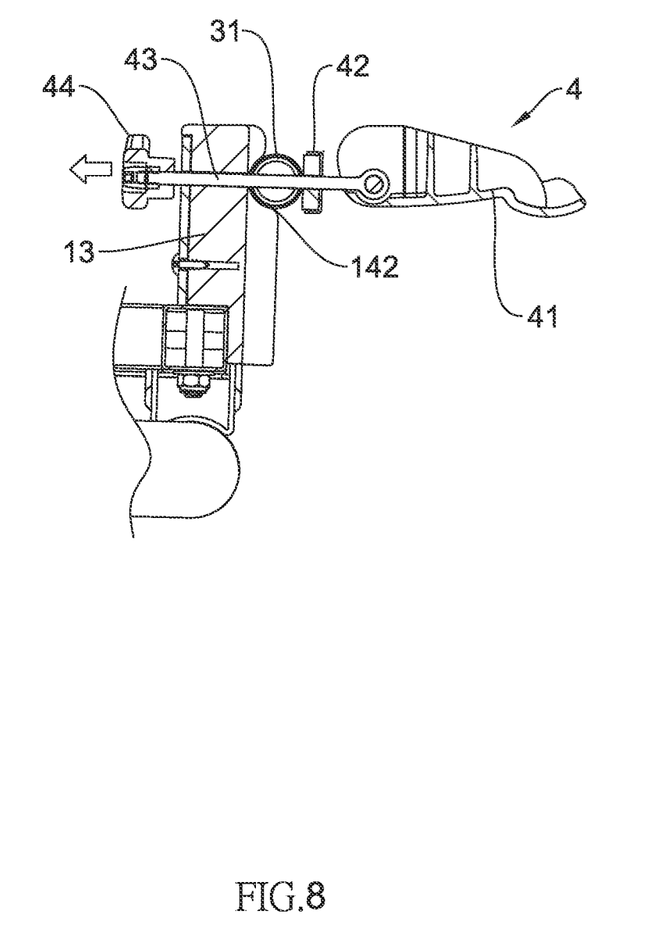
FIG. 8 is a cross sectional view to show that the tube of the upright frame is released by pivoting the lever the quick-release downward.
Figure 9:
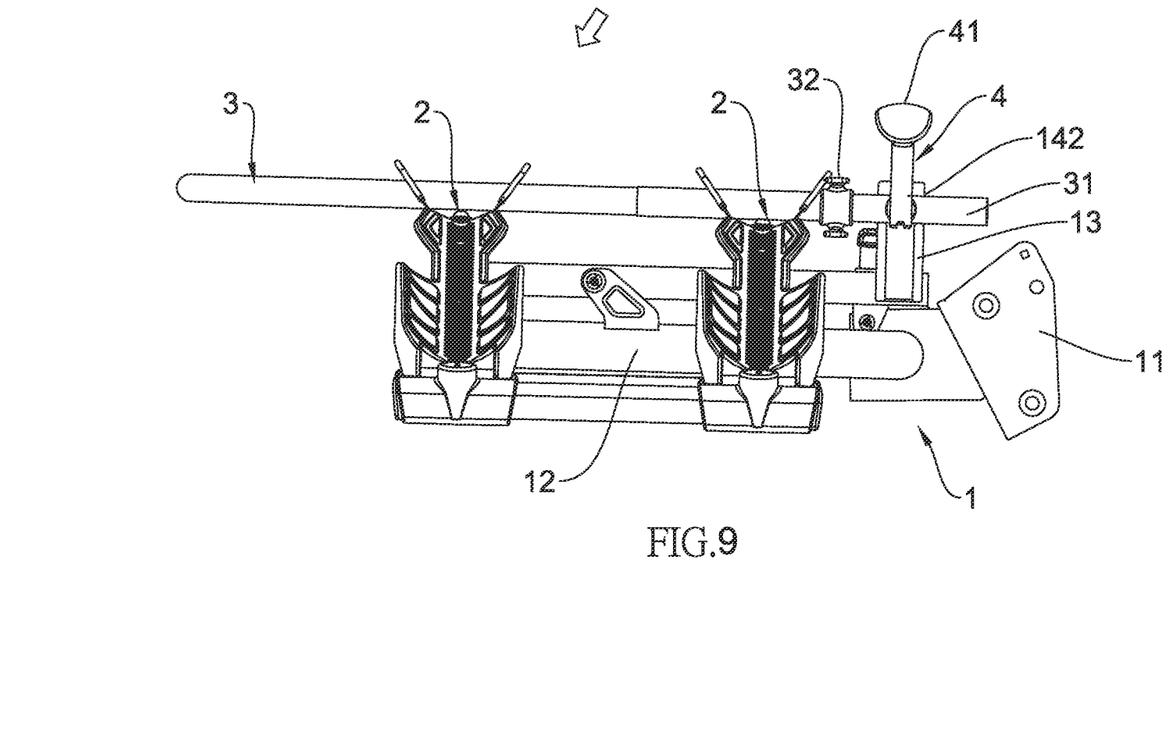
FIG. 9 shows that the upright frame is pivoted toward the support of the foldable bicycle rack of the present invention.

As shown in FIGS. 5 to 8, when the lever 41 is pivoted upward as shown in FIG. 6, the shaft 43 is pulled and the quick-release 4 is in a locked status. The tube 31 is locked between the engaging part 42 and the restriction part 14, such that the upright frame 3 is positioned at an upright position when the tubes 31 are located in the upright grooves 141 as shown in FIGS. 6 and 7, or the upright frame 3 is positioned at a transverse position when the tubes 31 are located in the transverse grooves 142 as shown in FIG. 8. Of course, each engaging part 42 and each of the upright groove 141 and the transverse groove 142 of each restriction part 14 include a curved inner face that is matched with the tubes 31 of the upright frame 3.

Each of the two tubes 31 of the upright frame 3 includes a sleeve 32 mounted thereto. The sleeve 32 includes two protrusions 321. A resilient rope 5 includes two loop ends mounted to the protrusions 321, and the resilient rope 5 is mounted to the lever 41 of the quick-release 4 corresponding thereto so as to restrict the lever 41 from shaking.

By removing the resilient rope 5 from each quick-release 4, the lever 14 is able to be pivoted downward to release the tube 31 of the upright frame 3. The two tubes 31 are then able to be positioned in the upright grooves 141 or the transverse grooves 142 to set the upright frame 3. When the two tubes 31 are positioned in the transverse grooves 142, the upright frame 3 is positioned toward the base 1.

While we have shown and described the embodiment in accordance with the present invention, it should be clear to those skilled in the art that further embodiments may be made without departing from the scope of the present invention.

What is claimed is:

1. A foldable bicycle rack comprising:
   a base including a connector and a platform, the platform including two posts connected thereto, each post including a restriction part formed thereto, each of the restriction parts including an upright groove and a transverse groove that are distinctly formed, with the upright groove oriented in a substantially vertical direction and the transverse groove oriented in a substantially horizontal direction;
   at least one support connected to the platform and including two trays;
   an upright frame being an inverted U-shaped frame and including two tubes, each tube including a hole defined therethrough, the tubes of the upright frame each being partially located in either the upright groove or the transverse groove such that the upright frame being pivotably folded toward the at least one support, and
   two quick-releases respectively connected to the two tubes, each quick-release including a lever, an engaging part, a shaft and a nut, the shaft pivotably connected to the lever and extending through the engaging part and the hole of the tube corresponding to the shaft and being connected to the nut, each of the two tubes of the upright frame including a sleeve mounted thereto, the sleeve including two protrusions, a resilient rope including two ends mounted to the protrusions, the resilient rope mounted to the lever of the quick-release corresponding thereto, when the lever is pivoted and the quick-release is in a locked status, the tube is locked between the engaging part and the restriction part such that the upright frame is positioned at an upright position or a transverse position.

2. The foldable bicycle rack as claimed in claim 1, wherein each engaging part and each of the upright groove and the transverse groove of each restriction part include a curved inner face that is matched with the tubes of the upright frame.

* * * * *